United States Patent [19]

Kerfoot et al.

[11] Patent Number: 4,571,262
[45] Date of Patent: Feb. 18, 1986

[54] RECOVERY OF PLATINUM GROUP METALS FROM NICKEL-COPPER-IRON MATTE

[75] Inventors: Derek G. E. Kerfoot, St. Albert; Russell P. Kofluk, Opal; Donald R. Weir, Fort Saskatchewan, all of Canada

[73] Assignee: Sherritt Gordon Mines Limited, Toronto, Canada

[21] Appl. No.: 710,738

[22] Filed: Mar. 11, 1985

[30] Foreign Application Priority Data

Oct. 24, 1984 [CA] Canada .................................. 466221

[51] Int. Cl.⁴ ........................ C22B 11/04; C01G 3/00; C01G 53/00
[52] U.S. Cl. .................................. 75/101 R; 423/22; 423/27; 423/36; 423/41; 423/42; 423/45; 423/146; 423/150; 423/509; 75/108; 75/117; 75/118 R; 75/119; 75/121; 75/115; 204/106; 204/109; 204/112
[58] Field of Search ........................ 423/22, 27, 36, 41, 423/42, 45, 146, 150, 508, 509; 75/101 R, 108, 117, 115, 118 R, 119, 121; 204/106, 109, 112

[56] References Cited

U.S. PATENT DOCUMENTS 4,038,362  7/1977  Gusy ........................................ 423/29
4,266,972  5/1981  Redondo-Abad et al. ............ 423/41
4,304,644 12/1981  Victorovich et al. ............... 423/150

Primary Examiner—John Doll
Assistant Examiner—Robert L. Stoll
Attorney, Agent, or Firm—Robert F. Delbridge; Arne I. Fors

[57] ABSTRACT

A process for separately recovering platinum group metal values, nickel values and copper from nickel-copper-iron sulphidic matte containing platinum group metals includes leaching ground matte at atmospheric pressure in acidic nickel-copper sulphate solution at a temperature in the range of from about 75° to about 105° C. and at a pH below about 4 initially under oxidizing conditions and subsequently under neutral or non-oxidizing conditions to cause dissolution of nickel and iron, precipitation of copper as a copper sulphide and precipitation of dissolved platinum group metals. The copper, nickel and platinum group metal containing solids are separated from the nickel and iron containing sulphate solution and are leached in acidic nickel-copper sulphate solution under pressurized oxidizing conditions at a temperature of from about 120° to about 180° C. to cause dissolution of nickel and copper with minor dissolution of platinum group metals. The platinum group metal containing solids are separated from the nickel and copper containing sulphate solution, and copper is electrowon from the nickel and copper containing sulphate solution under conditions to cause cathodic deposition of copper without significant deposition of nickel. Spent nickel and copper containing electrolyte solution which also contains minor amounts of dissolved platinum group metals is recycled to the atmospheric leach and pressure leaching steps.

9 Claims, 1 Drawing Figure

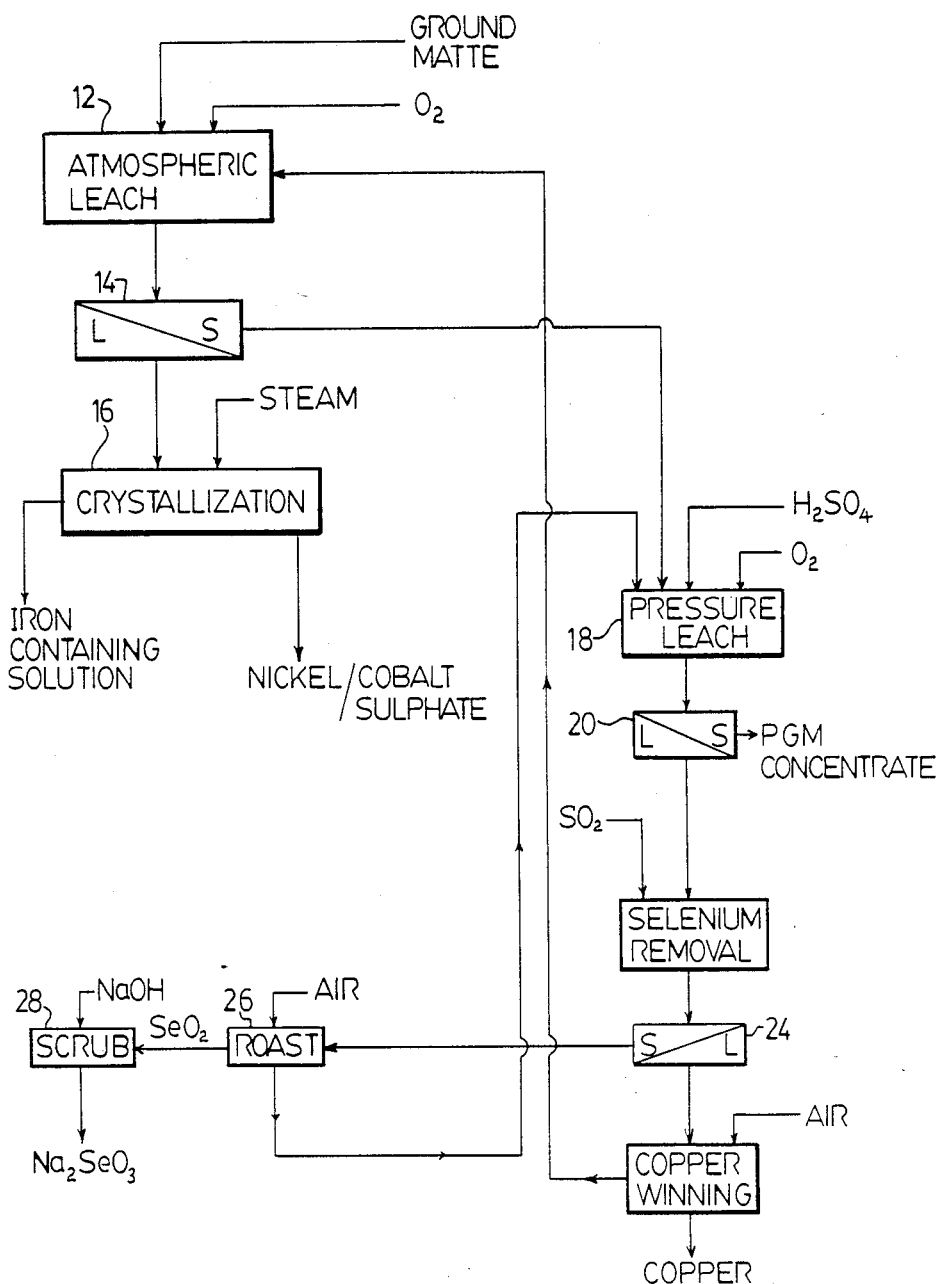

RECOVERY OF PLATINUM GROUP METALS FROM NICKEL-COPPER-IRON MATTE

This invention relates to the separate recovery of platinum group metal values, nickel values and copper from nickel-copper-iron sulphidic matte containing platinum group metals such as platinum, palladium, rhodium, ruthenium, osmium and iridium.

Platinum group metals frequently occur in economically significant concentrations in nickel-copper-iron sulphidic ores. To recover the platinum group metals, the usual commercial procedure is to concentrate and smelt the ore to form a high grade nickel-copper-iron sulphidic matte from which the contained platinum group metals must be recovered in a form suitable for treatment in a platinum metal refinery.

The separation of platinum group metal values from nickel-copper-iron sulphidic matte has generally been accomplished by selective leaching of nickel, copper and iron to leave an insoluble residue containing platinum group metals which can be treated in a platinum metal refinery. Prior processes for this purpose are described in U.S. Pat. No. 3,293,027 (Mackiw et al) issued Dec. 20, 1966, U.S. Pat. No. 3,741,752 (Evans et al) issued June 26, 1973, U.S. Pat. No. 3,767,760 (Hougen et al) issued Oct. 23, 1973, U.S. Pat. No. 3,959,097 (Queneau et al) issued May 25, 1976, U.S. Pat. No. 3,962,051 (Symens et al) issued June 8, 1976, and U.S. patent application Ser. No. 426,575 (Kerfoot et al) filed Sept. 29, 1982.

An object of the present invention is to provide a process for the separate recovery of platinum group metal values, nickel values and copper from nickel-copper-iron sulphidic matte which is relatively simple and inexpensive and is especially useful for a relatively small scale operation, while at the same time providing a high platinum group metal recovery. The above mentioned prior processes are not particularly suitable for a relatively small scale operation.

The present invention is partly based on the discovery that the matte can be subjected to an atmospheric leach in such a manner as to selectively precipitate copper while iron is leached and remains in solution.

According to the invention, ground matte is leached at atmospheric pressure in acidic nickel-copper sulphate solution at a temperature in the range of from about 75° to about 105° C. and at a pH below about 4 initially under oxidizing conditions and subsequently under neutral or non-oxidizing conditions to cause dissolution of nickel and iron, precipitation of copper as a copper sulphide and precipitation of dissolved platinum group metals. The copper, nickel and platinum group metal containing solids are separated from the nickel and iron containing sulphate solution and are leached in acidic nickel-copper sulphate solution under pressurized oxidizing conditions at a temperature of from about 120° to about 180° C. to cause dissolution of nickel and copper with minor dissolution of platinum group metals. The platinum group metal containing solids are separated from the nickel and copper containing sulphate solution, from which copper is then electrowon under conditions to cause cathodic deposition of copper without significant deposition of nickel. Spent nickel and copper containing electrolyte solution also containing minor amounts of dissolved platinum group metals is then recycled to the atmospheric leaching and pressure leaching steps.

The matte may contain by weight from about 30 to about 75% nickel, from about 5 to about 45% copper, from about 0.2 to about 5% iron, from about 6 to about 30% sulphur and up to about 0.5% platinum group metals.

The spent nickel and copper containing electrolyte solution may contain from about 10 to about 30 g/L copper, from about 20 to about 90 g/1 nickel and at least about 20 g/1 sulphuric acid.

When the matte also contains selenium which is dissolved in the pressure leaching step, the process may also include treating the nickel, copper and selenium containing sulphate solution with sulphur dioxide to precipitate a copper selenide together with some platinum group metal values, separating the copper selenide precipitate from the nickel and copper containing sulphate solution, removing selenium from the precipitate, and recycling the remaining precipitate containing platinum group metals to the pressure leach step. Selenium may be removed from the precipitate by roasting.

The matte may also contain tellurium which reports in the copper selenide precipitate, and selenium and tellurium may be removed therefrom by roasting to form a calcine containing copper selenite and copper tellurite, leaching the calcine to dissolve the selenite and tellurite, and recycling the leached calcine containing platinum group metals to the pressure leach step.

One embodiment of the invention will now be described, by way of example, with reference to the accompanying drawing which shows a flow sheet for a process for separately recovering platinum group metal values, nickel values and copper from nickel-copper-iron sulphidic matte.

Referring to the drawing, the process to be described is suitable for treating nickel-copper-iron sulphidic matte containing by weight from about 30 to about 75% nickel, from about 5 to about 45% copper, from about 2 to about 1% cobalt, from about 0.01 to about 0.2% selenium, from about 0.2 to about 5% iron, from about 6 to about 30% sulphur and up to about 0.5% platinum group metals.

Matte which has preferably been ground to 100% less than 150 $\mu$m is first treated in an atmospheric leach step 12 in acidic nickel-copper sulphate solution at a temperature in the range of from about 75° to about 90° C., the acidic nickel-copper sulphate solution being recycled spent electrolyte solution from a copper electrowinning step which will be described later. Such recycled spent electrolyte solution may typically contain from about 20 to about 90 g/L nickel, from about 10 to about 30 g/L copper, from about 25 to about 100 g/L sulphuric acid, and up to about 10 mg/L platinum group metals.

The atmospheric leach step 12 is conducted to maintain the pH in the range of from about 2 to about 4, with a controlled supply of oxygen or air such that the matte is initially leached under oxidizing conditions and then subsequently leached under neutral or non-oxidizing conditions. This can be achieved by carrying out the atmospheric leach step 12 in a series of tanks, with the leach slurry flowing from one tank to another. Oxidizing conditions in the initial part of the leach step 12 can be achieved by providing an air or oxygen sparge to the first and possibly also subsequent tanks, and neutral or non-oxidizing conditions can be provided in the later stages by restricting the access of air or oxygen to the remaining tanks in the series. Control of the pH can be achieved primarily by adjusting the ratio of spent electrolyte solution to matte in the feed to the atmospheric leach step 12, although sulphuric acid may be added either to the feed solution or to the final or near final tanks of the series.

By conducting the atmospheric leach step 12 in this matter, from about 40 to about 60% by weight of the nickel in the matte is dissolved. Copper is precipitated under the neutral or non-oxidizing conditions by a metathesis reaction as a copper sulphide, such as digenite ($Cu_{1.8}S$). Most of the iron dissolves and remains in solution as ferrous sulphate. Also, precipitated ferric oxide may be redissolved by adding acid to maintain the solution pH below about 2.5. There is no significant dissolution of platinum group metal values. Further, dissolved platinum group metal values such as rhodium and ruthenium in the recycled spent electrolyte are also precipitated in the atmospheric leach step 12.

As mentioned above, from about 40 to about 60% by weight of the nickel in the matte is dissolved. Also, from about 30 to about 80% by weight of the iron in the matte is dissolved together with from about 30 to about 50% by weight of the cobalt. Thus, the undissolved solids contain substantially all the platinum group metal values in the original matte as well as substantially all the copper. The product leach solution from the atmospheric leach step 12 will typically contain about 100 g/L nickel, 1 g/L cobalt, more than 1 g/L iron, less than 0.5 g/L copper and less than 3 mg/L platinum group metals at a pH in the range of 2 to 4. The undissolved solids may typically contain by weight about 30% nickel, about 40% copper, about 0.5% cobalt, about 0.45% iron, about 20% sulphur and about 0.3% platinum group metals.

The leach slurry then proceeds to a liquid/solids separation step 14, which may comprise thickening and/or filtration, from which the solution is passed to a crystallization step 16 to which steam is supplied to cause crystallization of a nickel sulphate product containing some cobalt and iron sulphates, which may be further treated in a nickel-cobalt refinery for recovery of metallic nickel and cobalt.

The solids containing copper and platinum group metals from the separation step 14 are passed to a pressure leach step 18 in which the solids are leached in a multicompartment autoclave under oxidizing conditions at a temperature of from about 135° to about 165° C. under a total pressure of from about 300 to about 1500 kPa in an acidic nickel-copper sulphate solution obtained mainly by recycle of spent electrolyte solution from the copper electrowinning step to be described. Make-up sulphuric acid may also be added. In the pressure leach step 18, nickel and copper are quantitatively dissolved with only minor dissolution of platinum group metal values. Lower temperatures are not satisfactory because the formation of elemental sulphur may occur, and such elemental sulphur may retard the leaching of copper and nickel sulphide and also cause the production of a lower grade platinum group metals concentrate due to the presence of unleached sulphides and sulphur. Higher temperatures are unsatisfactory because unacceptably high amounts of palladium may be dissolved. Nickel and copper extraction from the solids supplied to the pressure leach step 18 are typically greater than 99%, and essentially all the sulphur is oxidized to sulphuric acid in the preferred temperature range. A minimal amount of iron is dissolved.

Operaton of the pessure leach step 18 at a temperature of 150° to 165° C. will usually also result in a relatively high dissolution of selenium, when this is present in the matte. However, such selenium can readily be removed as will be described later.

The leach slurry then proceeds to a liquid/solids separation step 20 in which the platinum group metals concentrate is separated by filtration from the leach solution. The platinum group metal concentrate contains substantially all the platinum group metals in the original matte and contains low levels of nickel, copper and sulphur. Such a platinum group metals concentrate is especially suitable for treatment in a platinum group metals refinery.

The leach solution from the separation step 20 passes to a selenium removal step 22 where sulphur dioxide is injected into the solution as it passes through a pipeline reactor, for example as described in U.S. Pat. No. 4,330,508 (Weir et al) issued May 18, 1982, to precipitate selenium values as copper selenide. In this manner, the selenium content of the solution can be reduced to less than 1 mg/L, an amount which is acceptable for a copper electrowinning operation. Also, such a selenium removal step precipitates minor amounts of platinum group metal values which dissolved in the pressure leach step 18. It has been found that essentially all platinum group metal values in the solution can be quantitatively precipitated, except rhodium and ruthenium which as described above are precipitated in the atmospheric leach step 12. The selenium removal step 22 thus minimizes the risk of loss of platinum group metal values by codeposition or physical occlusion in the copper deposit in an electrowinning operation.

The copper selenide precipitate is separated from the leach solution in a liquid/solids separation step 24 which comprises filtration. Since the precipitate contains economically significant amounts of platinum group metal values, the precipitate is treated for the recovery of these values. The precipitate may be passed to a roast step 26 where it is roasted in air at about 700° C. to drive off selenium dioxide. The volatilized selenium dioxide may be collected in a caustic scrub step 28 using sodium hydroxide to form sodium selenite solution which may then be treated for the recovery of metallic selenium.

The selenium-free calcine produced in the roast step 26 and containing platinum group metal values may be recycled to the pressure leach step 18 so that the platinum group metal values are recovered in the leach residue. Alternatively however, if desired, instead of recycling to the pressure leach step 18, the calcine from the roast step 26 may be returned to a matte production furnace for recovery of the platinum group metal values.

The selenium-free leach solution from the separation step 24 passes to a copper electrowinning step 30 in which the copper in solution is partially recovered. The solution typically contains from about 30 to about 80 g/L copper, from about 20 to about 90 g/L nickel and from about 10 to about 40 g/L sulphuric acid, with less than 1 mg/L selenium and up to 10 mg/L rhodium and ruthenium. Since the nickel content of the solution is relatively high, the electrowinning step 30 is operated at a relatively low current density, for example from about 100 to about 150 A/$m^2$, to achieve good copper deposit characteristics. The copper deposit will typically contain less than 2 ppm selenium and less than 1 ppm platinum group metals. The spent electrolyte solution typically contains from about 10 to about 30 g/L copper, from about 20 to about 90 g/L nickel, and from about 25 to about 100 g/L sulphuric acid and is recycled partly to the atmospheric leach step and partly to the pressure leach step 18.

It will thus be clear from the above description that the present invention provides a high grade platinum group metal concentrate which is especially suitable for further treatment in a platinum group metal refinery, high quality electrowon copper, and nickel sulphate in a form suitable for further treatment in a nickel refinery. When gold is also present in the matte, the gold will report to the platinum group metal concentrate, i.e. there will be no significant gold dissolution in the atmospheric leach or in the pressure leach.

A specific example of a process in accordance with the invention will now be described.

Crushed nickel-copper-iron matte from a smelter contained by weight 47.9% nickel, 27.6% copper, 0.67% cobalt, 0.05% selenium, 0.59% iron, 21.4% sulphur and 1749 g/t platinum group metals plus gold. The crushed matte which was originally minus 13 mm material was ground in a ball mill circuit to 100% minus 150 $\mu$m, with 50% minus 37 $\mu$m.

The ground matte was subjected to an atmospheric leach at 80° to 90° C. in a series of four agitated tanks arranged in cascade, the leachant being spent electrolyte solution containing 15 g/L copper, 53 g/L nickel and 50 g/L sulphuric acid. Oxygen was sparged into the first two tanks only. The behaviour of iron and copper in the atmospheric leach is shown in Table 1.

TABLE 1

| Tank | pH | Solution, g/l | | |
|---|---|---|---|---|
| | | $H_2SO_4$ | Cu | Fe |
| Feed | — | 50.0 | 15.4 | 0.48 |
| 1 | 1.6 | 7.3 | 9.1 | 1.04 |
| 2 | 2.0 | 2.3 | 5.2 | 1.10 |
| 3 | 2.8 | — | 1.6 | 1.12 |
| 4 | 3.8 | — | 0.02 | 1.18 |

Adjusting the solution to pH 2.0 in tank 4 by adding sulphuric acid increased the extraction of iron from the matte from about 30% to over 50%.

No extraction of platinum, palladium, gold or iridium occurred. The precipitation of rhodium from the feed solution was 95% complete in the pH range of 2 to 3.8, but only just over 50% at pH 2.1.

After filtration from the atmospheric leach slurry, the solids residue was subjected to pressure leaching in a multi-compartment autoclave with spent electrolyte solution at a maximum leach temperature of 165° C. under a total pressure of 1000 kPa. Extraction data are shown in Table 2.

TABLE II

| Element | Extraction (Matte Basis) % |
|---|---|
| Co | 98.6 |
| Cu | 99.93 |
| Fe | 62 |
| Ni | 99.87 |
| S | 99.93 |
| As | 90 |
| Pb | 85 |
| Se | 85 |
| Te | 95 |
| Pt | 0.03 |
| Pd | 0.41 |
| Au | 0.15 |
| Rh | 30 |
| Ru | 36 |
| Ir | <2 |

The pressure leach residue was separated from the leach solution by polish filtration. The platinum group metal plus gold content of the residue was over 20%. The major remaining constituent of the pressure leach residue was iron, indicated by XRD analysis to be in the form of magnetite, which accounted for almost 50% of the residue. A further upgrading of such pressure leach residue may be accomplished by reductive leaching in hydrochloric acid solution in which the magnetite phase is readily soluble. Such an operation can readily be carried out in a platinum metal refinery.

The pressure leach solution was then treated with 2 to 3 g/L sulphur dioxide in a 30 m pipeline reactor at 90° C. with a nominal retention time of 15 s. The selenium content of the solution was decreased from about 40 mg/L to less than 1 mg/L. The precipitate contained 25% selenium plus tellurinum, with 50 to 60% copper and about 2% platinum group metals.

After treatment with sulphur dioxide, the leach solution was essentially free from platinum, palladium, gold and iridium, although still containing significant levels of rhodium and ruthenium (which are precipitated in the atmospheric leach).

The copper selenide preicpitate was subjected to oxidation roasting at 700° C., effectively volatilizing selenium quantitatively from the precipitate without significant loss of platinum group metals.

The selenium-free pressure leach solution was subjected to copper electrowinning in a conventional electrolytic cell at a relatively low current density of 120 A/m$^2$ to compensate for the effect of the relatively high level of nickel sulphate in the solution. The copper concentration of the solution was reduced from 42 g/L to 19 g/L, while the free acid content increased from 23 g/L to 64 g/L sulphuric acid.

The cathode deposits, plated in the presence of a guar gum levelling agent, were generally smooth and compact in appearance. Impurity levels were typically low, with less than 1 g/t of antimony, bismuth, selenium, silver, tellurium and platinum group metals, and up to 5 g/t arsenic. The lead content was less than 1 g/t. The nickel content was negligible, the cathode copper being at least 99.9% pure.

Other embodiments and examples will be readily apparent to a person skilled in the art, the scope of the invention being defined in the appended claims.

What we claim as new and desire to protect by Letters Patent of the United States is:

1. A process for separately recovering platinum group metal values, nickel values and copper from nickel-copper-iron sulphidic matte containing platinum group metals comprising:

leaching ground matte at atmospheric pressure in acidic nickel-copper sulphate solution at a temperature in the range of from about 75 to about 105° C. and at a pH below about 4 initially under oxidizing conditions and subsequently under neutral or non-oxidizing conditions to cause dissolution of nickel and iron, precipitation of copper as a copper sulphide and precipitation of dissolved platinum group metals, separating copper, nickel and platinum group metal containing solids from nickel and iron containing sulphate solution, leaching the copper, nickel and platinum group metal containing solids in acidic nickel-copper sulphate solution under pressurized oxidizing conditions at a temperature of from about 120° to about 180° C. to cause dissolution of nickel and copper with minor dissolution of platinum group metals, separating platinum group metal containing solids from nickel and copper containing sulphate solution, electrowinning copper from the nickel and copper containing sulphate solution under conditions to cause cathodic deposition of copper without significant deposition of nickel, and recycling spent nickel and copper containing electrolyte solution also containing minor amounts of dissolved platinum group metals to the atmospheric leach and pressure leaching steps.

2. A process according to claim 1 wherein the matte contains by weight from about 30 to about 75% nickel, from about 5 to about 45% copper, from about 0.2 to about 5% iron, from about 6 to about 30% sulphur and up to about 0.5% platinum group metals.

3. A process according to claim 1 wherein the spent nickel and copper containing electrolyte solution contains from about 10 to about 30 g/L copper, from about 20 to about 90 g/L nickel, and at least about 20 g/L sulphuric acid.

4. A process according to claim 1 wherein the matte also contains selenium which is dissolved in the pressure leaching step, and the process includes treating the nickel, copper and selenium containing sulphate solution with sulphur dioxide to precipitate a copper selenide together with some platinum group metal values, separating the copper selenide precipitate from the nickel and copper containing sulphate solution, removing selenium from the precipitate, and recycling the remaining precipitate containing platinum group metals to the pressure leach step.

5. A process according to claim 4 wherein the selenium is removed from the precipitate by roasting to drive off selenium as selenium dioxide.

6. A process according to claim 4 wherein the matte also contains tellurium which reports in the copper selenide precipitate, and selenium and tellurium are removed therefrom by roasting to form a calcine containing copper selenite and copper tellurite, leaching the calcine to dissolve the selenite and tellurite, and recycling the leached calcine containing platinum group metals to the pressure leach step.

7. A process according to claim 1 wherein ground matte is leached at a temperature in the range of from about 75° to about 90° C.

8. A process according to claim 1 wherein the ground matte is leached at a pH in the range of from about 2 to about 4.

9. A process according to claim 1 wherein the copper, nickel and platinum group metal containing solids are leached at a temperature in the range of from about 135° to about 165° C.

* * * * *